United States Patent
Paliy et al.

(10) Patent No.: US 9,361,537 B2
(45) Date of Patent: Jun. 7, 2016

(54) TECHNIQUES TO REDUCE COLOR ARTIFACTS IN A DIGITAL IMAGE

(71) Applicants: Dmytro Paliy, Tampere (FI); Lasse Lampinen, Tampere (FI); Jarno Nikkanen, Kangasala (FI)

(72) Inventors: Dmytro Paliy, Tampere (FI); Lasse Lampinen, Tampere (FI); Jarno Nikkanen, Kangasala (FI)

(73) Assignee: INTEL CORPORATION, Santa Clara, CA (US)

( * ) Notice: Subject to any disclaimer, the term of this patent is extended or adjusted under 35 U.S.C. 154(b) by 86 days.

(21) Appl. No.: 14/182,824

(22) Filed: Feb. 18, 2014

(65) Prior Publication Data
US 2015/0146979 A1    May 28, 2015

Related U.S. Application Data

(60) Provisional application No. 61/909,914, filed on Nov. 27, 2013.

(51) Int. Cl.
| | |
|---|---|
| G06K 9/00 | (2006.01) |
| G06K 9/40 | (2006.01) |
| H04N 9/64 | (2006.01) |
| H04N 5/357 | (2011.01) |
| H04N 17/00 | (2006.01) |

(52) U.S. Cl.
CPC ............. G06K 9/40 (2013.01); H04N 5/3572 (2013.01); H04N 9/646 (2013.01); H04N 17/002 (2013.01)

(58) Field of Classification Search
CPC ....... G06K 9/40; H04N 9/646; H04N 17/002; H04N 5/3572; G06T 5/009; G06T 2207/20208; G06T 2207/10024
USPC .................. 382/167, 274, 275, 284; 348/251
See application file for complete search history.

(56) References Cited

U.S. PATENT DOCUMENTS

| | | | | |
|---|---|---|---|---|
| 7,834,925 | B2 * | 11/2010 | Kim ............................. | 348/335 |
| 8,089,534 | B2 * | 1/2012 | Rao et al. ..................... | 348/241 |
| 8,223,229 | B2 * | 7/2012 | Nguyen ........................ | 348/251 |
| 8,593,548 | B2 * | 11/2013 | Sun .............................. | 348/251 |
| 8,957,998 | B2 * | 2/2015 | Hyun ........................... | 348/251 |
| 2004/0257454 | A1 | 12/2004 | Pinto et al. | |
| 2009/0322892 | A1 | 12/2009 | Smith et al. | |

(Continued)

FOREIGN PATENT DOCUMENTS

| | | |
|---|---|---|
| JP | 2013198041 | 9/2013 |
| KR | 20110072213 | 6/2011 |

OTHER PUBLICATIONS

Extended European Search Report received for European Patent Application No. 14192390.4, mailed Apr. 7, 2015, 6 pages.

(Continued)

Primary Examiner — Kanjibhai Patel

(57) ABSTRACT

Techniques for reducing color artifacts in a digital image are described. In one embodiment, for example, an apparatus may comprise logic, at least a portion of which is in hardware, the logic to determine a respective set of error values for each of a set of lens shading correction (LSC) tables, each set of error values describing error associated with application of its corresponding LSC table to a preprocessed image, determine a respective weight for each of the set of LSC tables based on the corresponding set of error values for that LSC table, and generate a composite LSC table for the preprocessed image as a weighted sum of the set of LSC tables, based on the respective weights for the set of LSC tables. Other embodiments are described and claimed.

25 Claims, 12 Drawing Sheets

(56) References Cited

U.S. PATENT DOCUMENTS

2010/0110241 A1 5/2010 Rao et al.
2011/0149112 A1 6/2011 Muukki et al.

OTHER PUBLICATIONS

Office Action received for Korean Patent Application No. 10-2014-145726, mailed Aug. 11, 2015, 5 pages (untranslated).

* cited by examiner

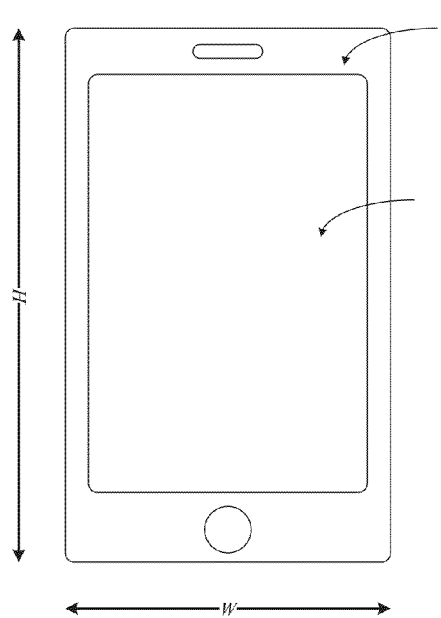
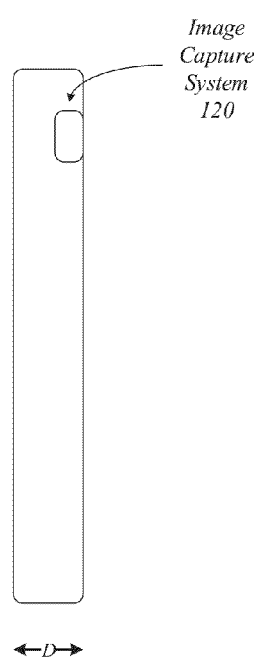
FIG. 1A  FIG. 1B

*Sample Distribution 600*  *Sample Distribution 610*

TECHNIQUES TO REDUCE COLOR ARTIFACTS IN A DIGITAL IMAGE

RELATED CASE

This application claims priority to U.S. Provisional Patent Application No. 61/909,914, filed Nov. 27, 2013, the entirety of which is hereby incorporated by reference.

BACKGROUND

Electronic devices are taking on smaller form factors at an increasing rate. Smartphones, tablets and wearable computers are attempting to miniaturize various components to allow such devices to be more convenient to use. At the same time, more features and components are being integrated into these smaller form factor devices. For instance, a smartphone may include a digital camera capable of producing digital images. While reducing form factors may increase user convenience, however, it often does so at the sacrifice of performance or quality. With respect to digital cameras, slimmer form factors often result in digital images with color artifacts and discolorations. It is with respect to these and other considerations that the present improvements are needed.

BRIEF DESCRIPTION OF THE DRAWINGS

FIG. 1A illustrates a first perspective of a first device.
FIG. 1B illustrates a second perspective of the first device.

DETAILED DESCRIPTION

Figure 2:
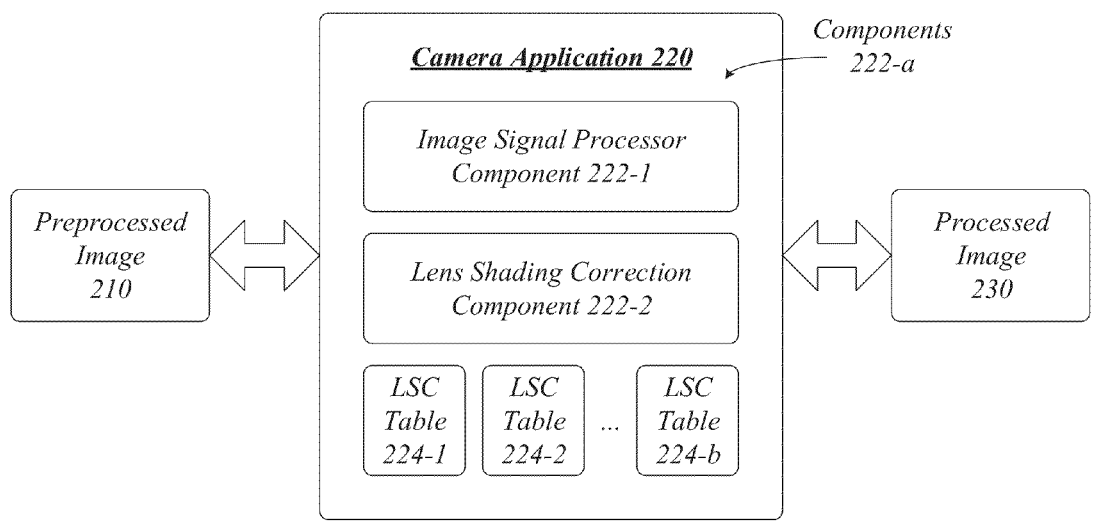
FIG. 2 illustrates an embodiment of an application subsystem.

Various embodiments are generally directed to image capture systems, such as digital cameras. Some embodiments are particularly directed to image capture devices integrated into a multi-function electronic device, such as a smartphone, tablet, wearable computer, and other smaller form factor devices. In one embodiment, for example, an apparatus may comprise logic, at least a portion of which is in hardware, the logic to determine a respective set of error values for each of a set of lens shading correction (LSC) tables, each set of error values describing error associated with application of its corresponding LSC table to a preprocessed image, determine a respective weight for each of the set of LSC tables based on the corresponding set of error values for that LSC table, and generate a composite LSC table for the preprocessed image as a weighted sum of the set of LSC tables, based on the respective weights for the set of LSC tables. Other embodiments may be described and claimed.

Reference is now made to the drawings, wherein like reference numerals are used to refer to like elements throughout.

In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

FIGS. 1A, 1B illustrate various perspectives for a device 100. Device 100 may comprise any electronic device having an image capture system 120 to capture and process an image. As shown in FIG. 1, the device 100 may comprise a smaller form factor device, such as a smartphone, having a digital display 102 arranged to present a digital image 104. A more detailed block diagram of the device 100, and exemplary devices, may be described with reference to FIG. 8.

A multi-function electronic device such as a smartphone may often have a form factor with height (H), width (W) and depth (D) dimensions sized to easily fit in a palm of an average hand of a user. In such cases, the device 100 may have a depth (D) measured in millimeters (mm). For instance, conventional smartphones may easily have a representative depth of 7.6 mm or thinner. When a device 100 of such narrow depth incorporates an image capture system 120, such as a digital camera, it necessarily decreases a distance between camera optics and an image sensor. The decreased distance causes light to strike various portions of the image sensor in a non-uniform manner, such as concentrating light towards a center of the image sensor and attenuating light towards the outer edges of the image sensor. To correct for such non-uniformity, the image capture system 120 may implement various lens shading correction (LSC) algorithms to compensate. An LSC algorithm may utilize one or more correction tables to perform such correction.

Embodiments attempt to correct these and other problems by utilizing enhanced image processing techniques designed to reduce color artifacts, shading correction, and other image quality issues in a digital image, which are essential for performance of successive operations such as auto white-balance (AWB) operations. More particularly, embodiments may utilize an enhanced LSC algorithm that implements a multi-phase approach to image processing and correction. The enhanced LSC algorithm may implement, for example, a characterization phase to create one or more LSC tables that can be used to compensate for color distortion and shading of a digital image. The enhanced LSC algorithm may implement, for example, a correction phase that analyzes a digital image to quantify color distortion and spatial information of the digital image 104. The correction phase may then select one or more of the LSC tables to use for processing and correcting the digital image 104 based on the pre-processing analysis of the digital image 104.

The enhanced LSC algorithm offers significant advantages over conventional LSC algorithms. The enhanced LSC algorithm may offer a practical and efficient solution for color distortions due to optical lens shading. For instance, the enhanced LSC algorithm may reduce or minimize color artifacts in the digital image 104. The enhanced LSC algorithm will attempt to identify and select one or more LSC tables that will correct the digital image 104 with a smallest amount of error relative to the actual scene captured by the image capture system 120. In this manner, embodiments offer significant improvements in image quality, particularly for smaller form factor devices such as the device 100, while utilizing lower levels of computation power relative to devices utilizing conventional LSC algorithms. As a result, the embodiments can improve affordability, scalability, modularity, extendibility, or interoperability for an operator, device or network.

FIG. 2 illustrates a block diagram for an application subsystem 200 of the camera system 120. In one embodiment, the application subsystem 200 may comprise a computer-implemented application subsystem 200 having a camera application 220 comprising one or more components 222-a. Although the application subsystem 200 shown in FIG. 2 has a limited number of elements in a certain topology, it may be appreciated that the application subsystem 200 may include more or less elements in alternate topologies as desired for a given implementation.

It is worthy to note that "a" and "b" and "c" and similar designators as used herein are intended to be variables representing any positive integer. Thus, for example, if an implementation sets a value for a=5, then a complete set of components 222-a may include components 222-1, 222-2, 222-3, 222-4 and 222-5. The embodiments are not limited in this context.

The application subsystem 200 may comprise, among other components, the camera application 220. The camera application 220 may be generally arranged to take as input a preprocessed image 210 captured by the image capture system 120 of the device 100, and output a processed image 230. The preprocessed image 210 may comprise a digital image 104 captured by the image capture system 120 in a raw form, before any enhancements and/or corrections have been applied. The processed image 230 may comprise the preprocessed image 210 after enhancements and/or corrections have been applied, such as by the LSC component 222-2. In one embodiment, the images 210, 230 may be color images. In one embodiment, the images 210, 230 may be non-color images.

The camera application 220 may comprise an image signal processor (ISP) component 222-1. The ISP component 222-1 may be generally arranged to receive as input raw image information from the preprocessed image 210, collect selective image data and/or statistics from the raw image information, and output processed image information to another system of the device 100, such as a video controller to present the processed image 230 on the digital display 102. The ISP component 222-1 may also receive as input identifiers for one or more LSC tables 224 that are selected by the LSC component 222-2.

The camera application 220 may comprise a LSC component 222-2. The LSC component 222-2 may be generally arranged to implement an enhanced LSC algorithm. The LSC component 222-2 may receive the selective image data and/or statistics from the ISP component 222-1, and select one or more LSC tables 224, or a combination of LSC tables 224, to correct shading in the preprocessed image 210 based on the received image data and/or statistics. The LSC component 222-2 may output identifiers for the selected one or more LSC tables 224 to the ISP component 222-1 for use in processing and correcting the raw image information from the preprocessed image 210, and generate the processed image 230.

The camera application 220 may comprise one or more LSC tables 224-b for use by the ISP component 222-1 and/or the LSC component 222-2. The LSC tables 224 may be generally arranged to store one or more correlated color temperature (CCT) values for commonly used light illuminants.

Figure 3A:
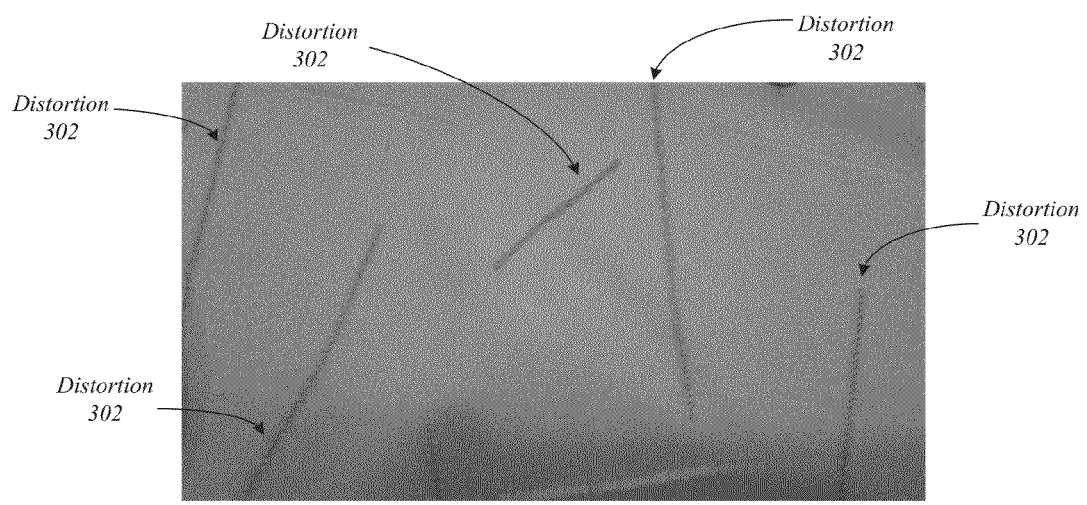
FIG. 3A illustrates an embodiment of a first image.

FIG. 3A illustrates an image 300 processed using conventional correction techniques. In conventional image processing systems, color distortions may occur due to incorrect optical lens shading. Lens shading is primarily originated by unequal light distribution throughout an image sensor plane caused by compressed distances between optics and the image sensor, which in turn is caused by smaller form factors of electronic devices such as device 100. Light is attenuated more near corners of the image sensor and less in the optical center of the image sensor. This attenuation is not static throughout color planes which results in severe color distortions. Typical results are digital images that are brighter in the center, darker near the edges, artificial colors, and attenuated with respect to the original scene.

The image 300 illustrates some examples of color distortions 302. As shown in image 300, clear visible distortions 302 are throughout the image 300. The distortions 302 are created, in part, due to the inadequate corrections provided by conventional LSC algorithms.

Figure 3B:
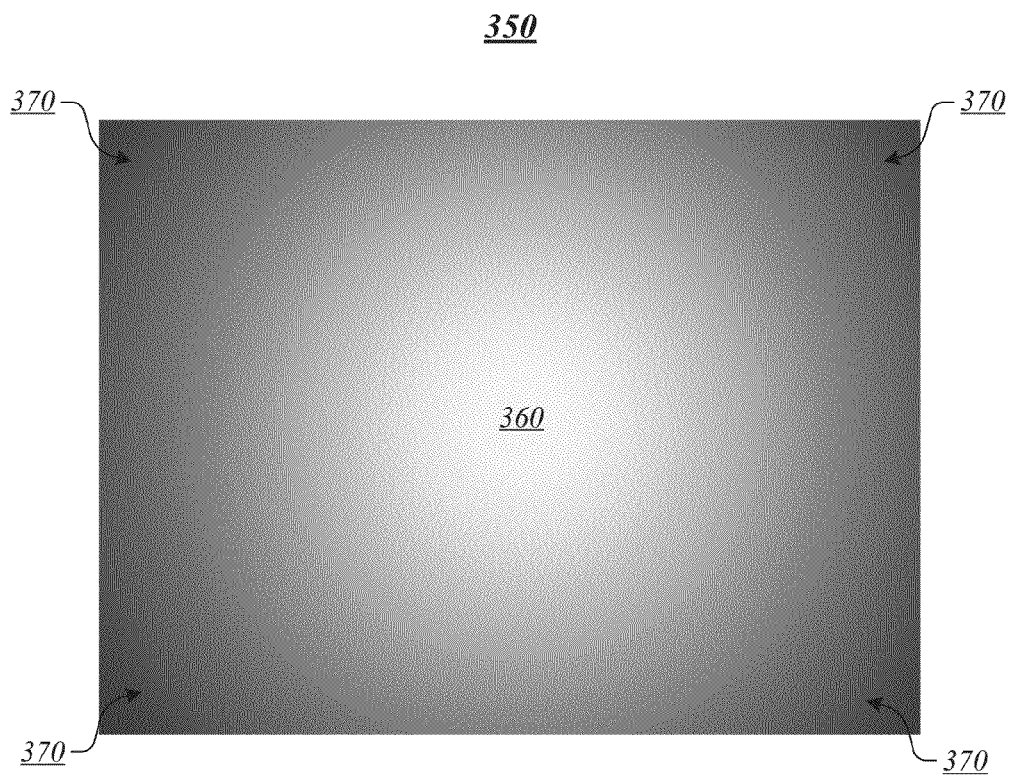
FIG. 3B illustrates an embodiment of a second image.

FIG. 3B illustrates an image 350 that illustrates lens shading distortions on a perfectly flat test area. As shown in FIG. 3B, corner regions 370 of image 350 are darker than a central region 360 of image 350. This suggests that light attenuation due to optical lens shading is greater with respect to corner regions 370 than it is with respect to central region 360. The embodiments are not limited to this example.

Referring again to FIG. 2, in order to compensate for light attenuation, the camera application 220 may store a number of LSC tables 224. Each LSC table 224 may include correction factors for the image capture system 120, utilizing primarily commonly used light sources. One task of the camera application 220 controlling the image capture system 120 is to decide which LSC table 224 should be used for correcting a digital image 104, based on analyzed content of the digital image 104.

The camera application 220 provides superior selection of LSC tables 224, which in turn may cause fewer distortions 302. This is accomplished by using enhanced techniques that are designed to quantify color distortion and utilize spatial information of an analyzed image. For instance, an analysis of the distortions 302 in the image 300 reveals that the distortions 302 are most noticeable and most efficiently measured in flat achromatic areas of the image 300. However, a typical scene is not flat and not achromatic. By identifying uniform smooth areas in a digital image 104, this information can be used for better selection of LSC tables 224. Specifically, color distortions are typically measured by a mean square error (MSE) with respect to origin in a hue, saturation and value (HSV) color space projected to a hue/saturation plane in a block of a corrected and white-balanced image. Blocks of an image where this error is the smallest are ones considered relevant for classification. Weights are assigned to an LSC table 224 that provides a smallest error in one, or several, image blocks.

This solution provides more robust and consistent results while remaining computationally simple in implementation. The camera application 220 automatically makes decisions in favor of the LSC table 224 that gives less color distortions. A typical use scenario is automatic color shading correction for low CCT light sources where adjacent incandescent/tungsten and fluorescent illuminants reside, whose properties are essentially different shading profiles. Another use scenario may be for any flat or semi-flat (e.g., texture) type of images typically used for image quality validation. These are merely examples, and other use scenarios exist as well.

In general, lens shading correction comprises two major phases, a characterization phase and a correction phase. The characterization phase is typically performed during design and assembly of the image capture system 120 of the device 100. The correction phase is typically performed in real-time during use of the image capture system 120.

The characterization phase is when the image capture system 120 is characterized. LSC tables 224 are created to cover most CCT value ranges for commonly used light illuminants. The LSC tables 224 are stored in persistent storage and later used during the correction phase. The camera application 220 controlling the image capture system 120 decides when, and in which proportion, each LSC table 224 should be used to compensate shading of a digital image 104.

The correction phase is performed during run-time execution, when data is streamed from the image capture system 120 to the ISP component 222-1. The ISP component 222-1 analyzes content from streamed image data, and supplementary metadata. Examples of metadata may include, without limitation, auto-focus, CCT estimate, time values, and so forth. Based on this information, the ISP component 222-1 calculates weights $w_l$, $l=0, \ldots, L-1$, where L is number of characterization light sources, that are used to fuse the tables $T_l$ into a single table using Equation (1) as follows:

$$T_C = \Sigma_l T_{C,l} * w_l \quad (1)$$

where $T_{C,l}$ is a matrix and $w_l$ is a scalar, and C denotes a color (Red, Green or Blue) index.

Figure 4:
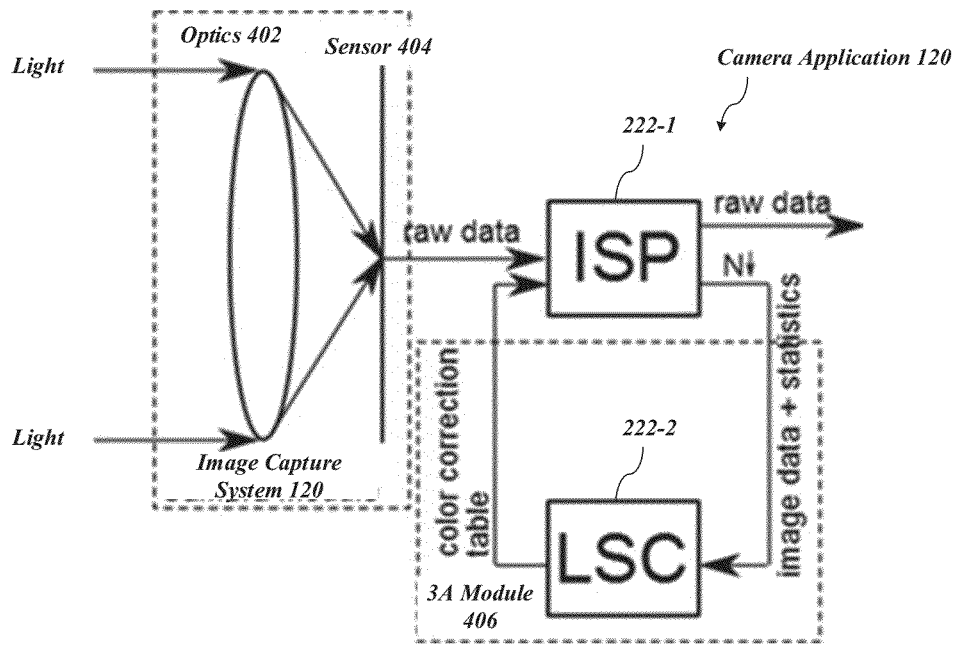
FIG. 4 illustrates an embodiment of an image subsystem.

FIG. 4 illustrates a block diagram of an image subsystem 400. The image subsystem 400 illustrates interoperability between portions of the image capture system 120 and the camera application 220 of the device 100.

The image capture system 120 may include, among other components, one or more optics 402 and one or more image sensors 404, where each optic is paired with a corresponding image sensor 404. Each of the image sensors 404 may be based on any of a variety of technologies for capturing an image of a scene, including and not limited to charge-coupled device (CCD) semiconductor technology. Each of the optics 402 is made up of one or more lenses, mirror, prisms, shutters, filters, etc. employed to convey images of a scene to and at least partly define the field of view of corresponding ones of the image sensors 404. The image sensors 404 and the optics 402 (whatever their quantity) are positioned and oriented relative to each other in a manner intended to provide each image sensor and optics pair with a field of view that overlaps field(s) of view of one or more of the other image sensor and optics pairs.

As shown in FIG. 4, light received by optics 402 is focused at an image sensor 404. The image sensor 404 provides raw image information in digital form as a stream of data to the ISP component 222-1. The ISP component 222-1 downscales the raw image information, calculates relevant statistics, and sends to an after focus, after white balance and after exposure (3A) block 406. The 3A module 406 includes the LSC component 222-2. The 3A module 406 analyzes the information provided by the ISP component 222-1, and calculates a CCT estimate and auto-focus (AF) statistics. The LSC component 222-2 selects and/or generates LSC tables 224 based on the CCT estimate and possibly AF statistics, and sends identifiers for the selected and/or generated LSC tables 224 to the ISP component 222-1. The ISP component 222-1 retrieves correction values from the selected and/or generated LSC tables 224, applies corrections, and generates an RGB image or video stream.

One focus of the camera application 220 is to estimate an original light source type by analyzing image content, and to identify a LSC table 224 that is most appropriate for the image using Equation (1) as previously described, where $T_{C,l}$ is created during the characterization phase and $w_l$ is calculated during the correction phase.

Figure 5:
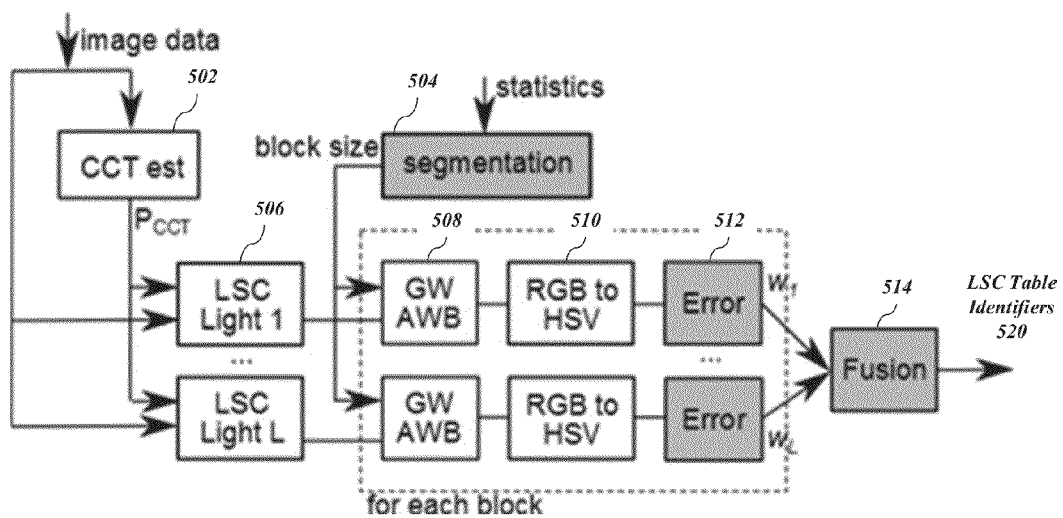
FIG. 5 illustrates an embodiment of a lens shading correction component.

FIG. 5 illustrates a block diagram of an exemplary LSC component 222-2 of the camera application 220. The LSC component 222-2 may receive selected image data and/or statistics for a preprocessed image 210 from the ISP component 222-1. The preprocessed image 210 may be captured by the image capture system 120 of the device 100. The preprocessed image 210 may be a single image, or a sequence of images, such as from a video sequence. The preprocessed image 210 may be received by the LSC component 222-2 of the camera application 220 in real-time from the image capture system 120, or in non-real time from a memory unit. Embodiments are not limited in this context.

The LSC component 222-2 may include an estimator module 502. The LSC component 222-2 receives image data from the ISP component 222-1. The estimator module 502 generates a CCT estimate. The estimator module 502 calculates a probability $P_{CCT}$ of presence of illuminant from a characterization database using subsampled input image data. For those illuminants with probabilities greater than zero, characterization LSC tables 224 are applied globally to input image data ($Light_1, \ldots, Light_L$).

The LSC component 222-2 may include a segmentation module 504. Segmentation module 504 receives AF statistics, and provides approximation of flat smooth areas in the scene based on the AF statistics in terms of processing areas. The segmentation module 504 then output block size, or a more complex segment of an image further denoted as just a block without loss of generality, based on the approximations. Size of a given processing block depends on content of the scene. For flat monotone scenes, for example, a single block of size H×W of image data may be used. For more complex scenes, with lots of texture, several blocks may be used (e.g., 12 to 24 blocks dividing the plane). Although block sizes may differ, each block should contain a sufficient amount of image data to provide a robust estimate of deviation between color samples (e.g., recommended minimum of 100).

For each set of input image data $Light_1, \ldots, Light_L$, the LSC component 222-2 may include a LSC module 506, a grey-world auto white balance (GW-AWB) module 508, a red/green/blue (RGB) to hue/saturation/value (HSV) module 510, and an error module 512. For each image block, the GW-AWB module 508, RGB to HSV module 510, and error module 512 processes an input image block, and outputs the processed image block to a fusion module 514. The fusion module 514 may then output one or more LSC table identifiers 520 corresponding to selected LSC tables 224, or alternatively the actual LSC tables 224, to the ISP component 222-1.

The error module 512 may calculate one or more errors $E_{l,b}$ for each illuminant l in a block-wise manner for each block b that is result of segmentation. The error module 512 calculates errors $E_{l,b}$ in the HSV color space (e.g., via RGB to HSV module 510) after application of a GW-AWB algorithm (e.g., via GW-AWB module 508) with respect to origin of coordinates (0 hue and 0 saturation) using Equation (2) as follows:

$$E_{l,b} = \frac{1}{H_b W_b} \sqrt{\Sigma_i h_i^2 s_i^2}. \quad (2)$$

where h is hue, s is saturation, $H_b$ is block size in a vertical direction, $W_b$ is block size in a horizontal direction, and l is an illuminant index. Value coordinates are ignored.

Figure 6A:
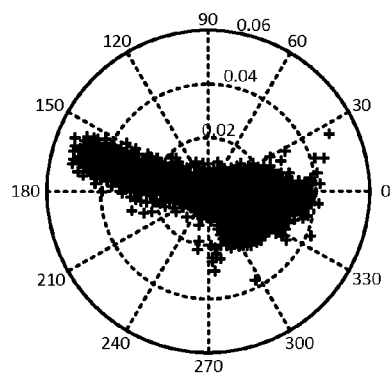
FIG. 6A illustrates an embodiment of a first sample distribution.
Figure 6B:
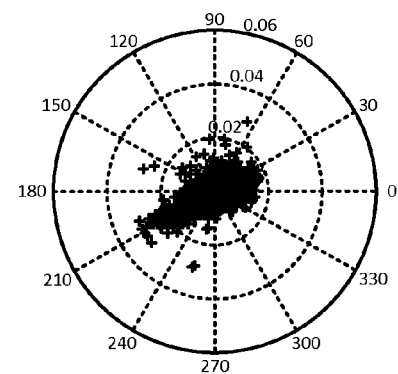
FIG. 6B illustrates an embodiment of a second sample distribution.

FIGS. 6A, 6B illustrate examples of h and s data distributions for flat regions in polar coordinates. FIG. 6A illustrates a sample distribution in hue/saturation polar coordinate for one block after applying incorrect LSC tables 224 implemented by conventional LSC components. FIG. 6B illustrates a sample distribution in hue/saturation polar coordinate for one block after applying correct LSC tables 224 using the enhanced LSC algorithm implemented by the LSC component 222-2. As shown in FIGS. 6A, 6B, hue h is angle and saturation s is radius.

A larger weight is given to an illuminant having a distribution concentrated around 0, therefore giving a smaller error with respect to origin, based on following Equation (3):

$$P_{l,b} = \begin{cases} 1, & E_{l,b} \leq E_{min}, \\ \dfrac{E_{max} - E_l}{E_{max} - E_{min}}, & E_{min} < E_l < E_{max}, \\ 0, & \text{otherwise} \end{cases} \quad (3)$$

where $E_{min} = \min_l\{E_{l,b}\}$, $E_{max} = E_{l,b}*$tolerance, b is block index, and tolerance is a relative constant representing how much error can be tolerated (e.g., a tolerance of 5% equals 1.05), or similar function not necessarily piece-wise linear, if computational resources allow. $W_{l,b}$ can then be calculated using Equation (4) as follows:

$$w_{l,b} = \frac{P_{l,b}}{E_{l,b}} \quad (4)$$

Referring again to FIG. 5, the LSC component 222-2 may include a fusion module 514. The fusion module 514 generates a final weight $w_l$ for each LSC table 224 as a weighted average of $w_{l,b}$. In one embodiment, a limited number of blocks (e.g., from 2 to 8) is taken into account whose respective errors $E_{l,b}$ are the smallest. Final weights are calculated based on a confidence $C_{l,b}$ of minimum errors $E_{l,b}$ in each block in a manner similar to Equation (3), whose tolerance value is larger (e.g. [2,4]) and subject to tuning using Equation (5) as follows:

$$w_l = \Sigma_b w_{l,b} C_{l,b} \quad (5)$$

In various embodiments, the reliabilities of errors $E_{l,b}$ calculated in Equation 2 and applied in Equations 3 and 4 may vary across the various blocks b of an image. For example, in some embodiments, some blocks may be more affected by noise than other blocks. Such non-uniformity may effect and tend to be especially prevalent under certain conditions, such as low-light conditions, for example. The embodiments are not limited in this context.

Any particular image that LSC component 222-2 analyzes may be described according to Equation (6) as follows:

$$z(x) = k(x)y(x) + \sigma(y(x))n \quad (6)$$

where $x = (x_i, x_j)$ is a spatial coordinate on the image plane, y(x) is a true expected unknown image value at spatial coordinate x, k is a two-dimensional grid of attenuation coefficients, n~N(0,1) is a random white Gaussian noise of zero mean and unity standard deviation, and σ is a function of standard deviation for noise, such that $std\{z(x)\} = \sigma(y(x))$.

In order to obtain a best estimate of the true image values in a sub-region, a solution is sought in the form of Equation (7):

$$\tilde{y}(x) = F\{k^{-1}(x)z(x)\} = F\{y(x) + k^{-1}(x)\sigma(y(x))n\} \quad (7)$$

where $F\{\cdot\}$ is an operator that indicates both grey-world white-balance and color space transformation.

In order to account for varying reliabilities of values of $\tilde{y}(x)$ calculated for various spatial locations, reliability parameters C(x) may be defined. In various embodiments, values of C(x) may be determined based on values of Std(x), which may be calculated according to Equation (8) as follows:

$$Std(x) = std\{H\{\tilde{y}(x)\} S\{\tilde{y}(x)\}\} \quad (8)$$

where $H\{\cdot\}$ indicates hue values, $S\{\cdot\}$ indicates saturation values, and std represents the standard deviation operator. In some cases, $\tilde{y}(x)$ may be highly non-linear, and thus formal calculated of Std(x) may be computationally intensive. In some embodiments, in order to conserve computational resources, C(x) may be defined using fixed approximations of expected values for Std(x). For example, in various embodiments in which an image is divided into four rows and six columns of sub-blocks, a set C of reliability parameters C(x) may be used that takes the matrix form illustrated in Equation (9):

$$C = \{c_b^{-1}\} = \begin{bmatrix} 8 & 2 & 2 & 2 & 2 & 8 \\ 4 & 2 & 1 & 1 & 2 & 4 \\ 4 & 2 & 1 & 1 & 2 & 4 \\ 8 & 2 & 2 & 2 & 2 & 8 \end{bmatrix} \quad (9)$$

where $c_b^{-1}$ represents the reciprocal of the coefficient to be used for the sub-block b positioned in the $i^{th}$ row and $j^{th}$ column. In various embodiments, the coefficients $C_{l,b}$ in Equation (5) may be weighted using $c_b^{-1}$. In some embodiments, the approximations used in such a set of reliability parameters may be empirically-based. For example, in various embodiments, such approximations may be based on simulation results and/or tests performed on actual image sensor data. The embodiments are not limited in this context. In some embodiments, interpolation may be used for some points x in order to avoid abrupt changes in weighting when image framing is only slightly changed. It is to be understood that in various embodiments, C may differ from the example in Equation (9), depending on the applicable attenuation factors and/or noise model. In some embodiments, block sizes and shapes that are subject to segmentation may vary, but reliability parameters C(x), similar to that illustrated in Equation (9), may be fixed and stored for a wide ranges of sensors and/or modules. The embodiments are not limited in this context.

Figure 7:
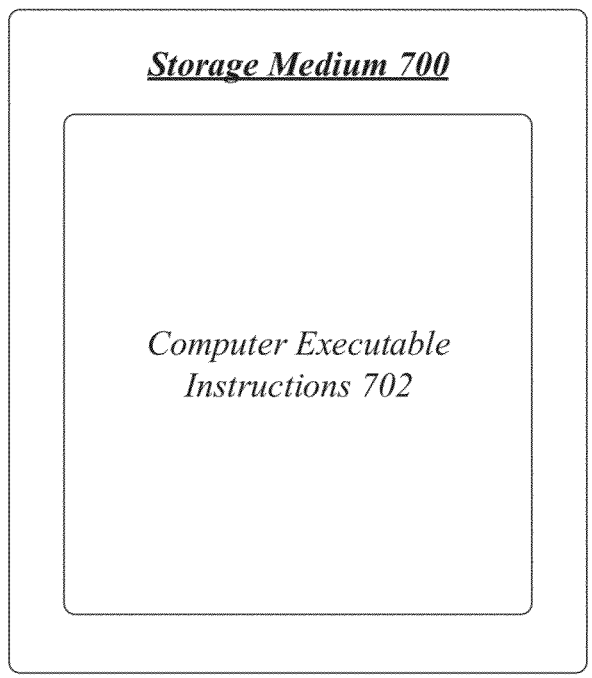
FIG. 7 illustrates an embodiment of a storage medium.

FIG. 7 illustrates an embodiment of a storage medium 700. The storage medium 700 may comprise an article of manufacture. In one embodiment, the storage medium 700 may comprise any non-transitory computer readable medium or machine readable medium, such as an optical, magnetic or semiconductor storage. The storage medium may store various types of computer executable instructions, such as instructions to implement one or more of the logic and/or operations described with reference to FIGS. 1-6. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The embodiments are not limited in this context.

Figure 8:
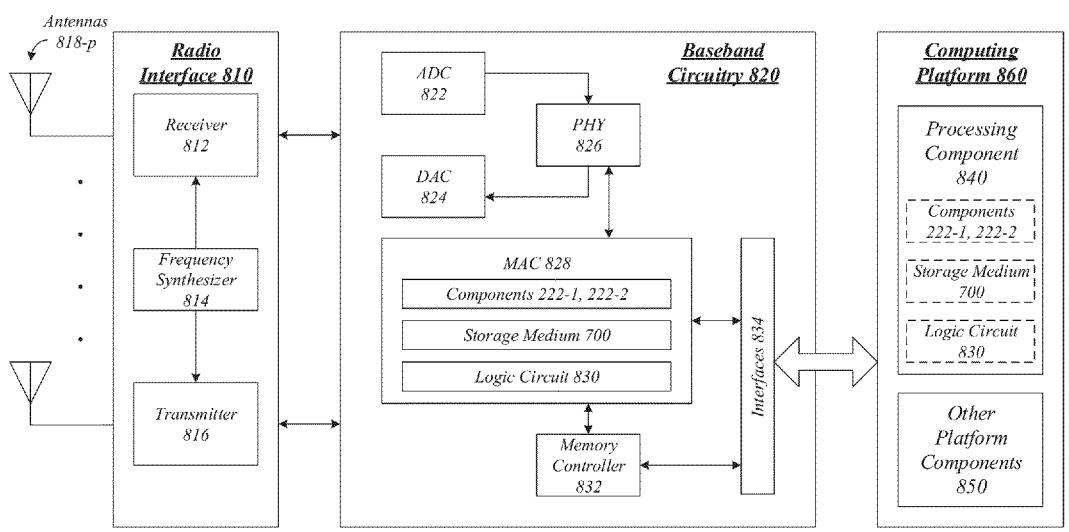
FIG. 8 illustrates an embodiment of a second device.

FIG. 8 illustrates an embodiment of a device 800. Device 800 may implement, for example, the device 100 and/or storage medium 700. As shown in FIG. 8, device 800 may include a radio interface 810, baseband circuitry 820, and computing platform 860, although embodiments are not limited to this configuration.

The device 800 may implement some or all of the structure and/or operations for the device 100 and/or storage medium 700 in a single computing entity, such as entirely within a single device. Alternatively, the device 800 may distribute portions of the structure and/or operations for the device 100 and/or storage medium 700 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context, In one embodiment, radio interface 810 may include a component or combination of components adapted for transmitting and/or receiving single carrier or multi-carrier modulated signals (e.g., including complementary code keying (CCK) and/or orthogonal frequency division multiplexing (OFDM) symbols) although the embodiments are not limited to any specific over-the-air interface or modulation scheme. Radio interface 810 may include, for example, a receiver 812, a transmitter 816 and/or a frequency synthesizer 814. Radio interface 810 may include bias controls, a crystal oscillator and/or one or more antennas 818-$p$. In another embodiment, radio interface 810 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 820 may communicate with radio interface 810 to process receive and/or transmit signals and may include, for example, an analog-to-digital converter 822 for down converting received signals, a digital-to-analog converter 824 for up converting signals for transmission. Further, baseband circuitry 820 may include a baseband or physical layer (PHY) processing circuit 856 for PHY link layer processing of respective receive/transmit signals. Baseband circuitry 820 may include, for example, a processing circuit 828 for medium access control (MAC)/data link layer processing. Baseband circuitry 820 may include a memory controller 832 for communicating with processing circuit 828 and/or a computing platform 860, for example, via one or more interfaces 834.

In some embodiments, PHY processing circuit 826 may include a frame construction and/or detection module, in combination with additional circuitry such as a buffer memory, to construct and/or deconstruct communication frames, such as radio frames 302-$e$. Alternatively or in addition, MAC processing circuit 828 may share processing for certain of these functions or perform these processes independent of PHY processing circuit 826. In some embodiments, MAC and PHY processing may be integrated into a single circuit.

The computing platform 860 may provide computing functionality for the device 800. As shown, the computing platform 860 may include a processing component 840. In addition to, or alternatively of, the baseband circuitry 820, the device 800 may execute processing operations or logic for the UE 80, base station 800, storage medium 1000, and logic circuit 830 using the processing component 830. The processing component 830 (and/or PHY 826 and/or MAC 828) may comprise various hardware elements, software elements, or a combination of both. Examples of hardware elements may include devices, logic devices, components, processors, microprocessors, circuits, processor circuits (e.g., processor circuits 220, 820), circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 860 may further include other platform components 850. Other platform components 850 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Device 800 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, node B, evolved node B (eNB), subscriber station, mobile subscriber center, radio network controller, router, hub, gateway, bridge, switch, machine, or combination thereof. Accordingly, functions and/or specific configurations of device 800 described herein, may be included or omitted in various embodiments of device 800, as suitably desired. In some embodiments, device 800 may be configured to be compatible with protocols and frequencies associated with one or more of the IEEE 802.11 Standards, Hotspot 2.0 Standards, 3GPP LTE Specifications and/or IEEE 802.16 Standards for WMANs, and/or other broadband wireless networks, cited herein, although the embodiments are not limited in this respect.

Embodiments of device 800 may be implemented using single input single output (SISO) architectures. However, certain implementations may include multiple antennas (e.g., antennas 818-$p$) for transmission and/or reception using adaptive antenna techniques for beamforming or spatial division multiple access (SDMA) and/or using MIMO communication techniques.

The components and features of device 800 may be implemented using any combination of discrete circuitry, application specific integrated circuits (ASICs), logic gates and/or single chip architectures. Further, the features of device 800 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 800 shown in the block diagram of FIG. 8 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

Operations for the above embodiments may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited in this context.

Figure 9:
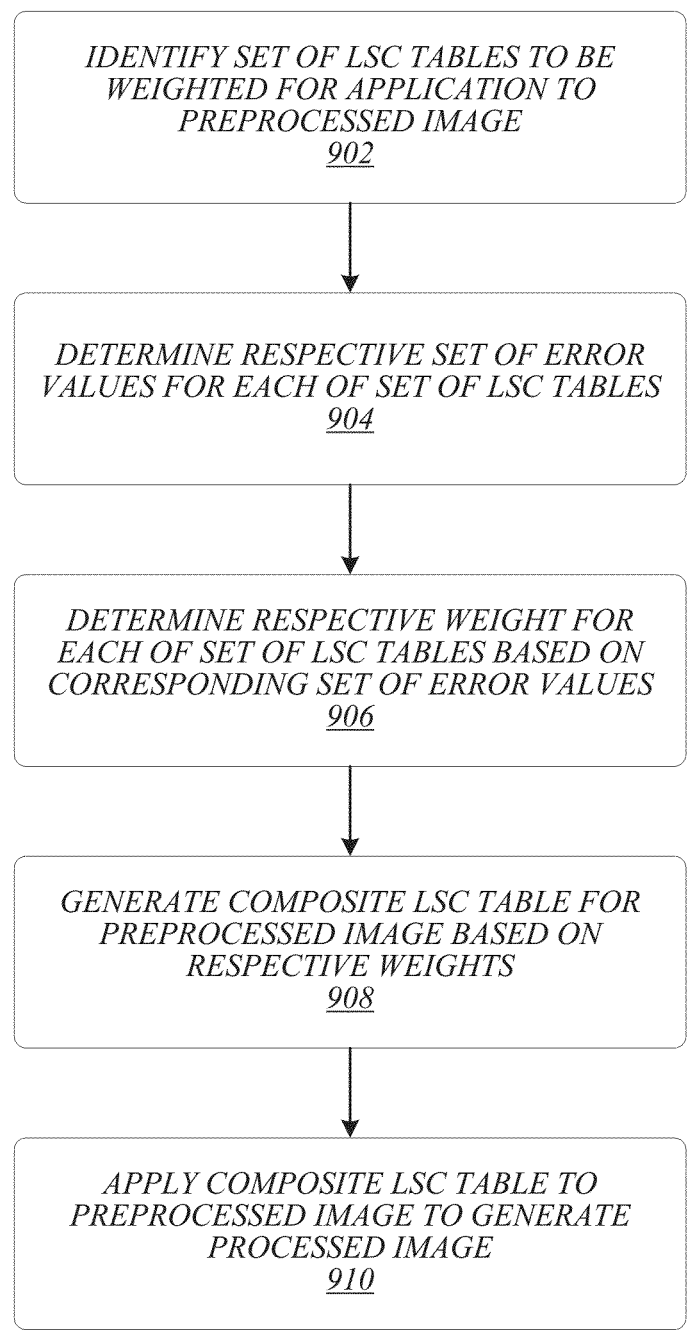
FIG. 9 illustrates an embodiment of a logic flow.

FIG. 9 illustrates one embodiment of a logic flow 900, which may be representative of the operations executed by one or more embodiments described herein. More particularly, logic flow 900 may be representative of operations that may be performed in various embodiments in order to generate a composite LSC table for application to a preprocessed image. In some embodiments, an apparatus, such as device 100 of FIGS. 1A, 1B and/or device 800 of FIG. 8, may comprise logic, at least a portion of which is in hardware, for performing one or more of the operations of logic flow 900. For example, in various embodiments, logic circuit 830 in device 800 of FIG. 8 may perform one or more of the operations of logic flow 900. In some embodiments, an apparatus may comprise a camera application, such as camera application 220 of FIG. 2, components of which may perform one or more such operations. In various embodiments, one or more storage mediums, such as storage medium 700 of FIG. 7, may comprise a set of instructions that, in response to being executed on a computing device, cause the computing device to perform one or more operations of logic flow 900. The embodiments are not limited in this context.

As shown in logic flow 900, a set of LSC tables to be weighted for application to a preprocessed image may be identified at 902. For example, LSC component 222-2 of FIG. 2 may be operative to identify a set of LSC tables 224 to be weighted for application to preprocessed image 210. In some embodiments, a respective probability of presence may be calculated for each of a plurality of LSC tables, and the set of LSC tables may be defined to comprise each LSC table among the plurality for which the probability of presence is greater than zero. In various such embodiments, each LSC table may correspond to a different respective illuminant, and the probability of presence for each LSC table may indicate a probability of presence of the illuminant to which that LSC table corresponds. The embodiments are not limited in this context.

At 904, a respective set of error values may be determined for each of the set of LSC tables. For example, LSC component 222-2 of FIG. 2 may be operative to determine a respective set of error values for each of a set of LSC tables 224. In some embodiments, each set of error values may describe error associated with application of its corresponding LSC table to the preprocessed image. In various embodiments, the preprocessed image may be segmented into multiple blocks, and the set of error values for each LSC table may comprise a set of block error values, each block error value comprising an error value for one of the multiple blocks. The embodiments are not limited in this context.

At 906, a respective weight may be determined for each of the set of LSC tables based on the corresponding set of error values for that LSC table. For example, LSC component 222-2 of FIG. 2 may be operative to determine a respective weight for each of a set of LSC tables 224 based on corresponding sets of error values for each of those LSC tables 224. In some embodiments, a respective set of block weights may be calculated for each LSC table in the set, based on a corresponding set of block error values for that LSC table, and each block weight may correspond to one of the multiple blocks. In various embodiments, the respective weight for each LSC table in the set may then be determined as a weighted sum of the block weights for that LSC table. In some such embodiments, a set of reliability parameters may be identified for each of the multiple blocks, and the weighted sum of the set of block weights for each LSC table may be calculated by weighting the block weights according to the reliability parameters for their corresponding blocks. In various embodiments, the reliability parameters may indicate levels of reliability for error values of their corresponding blocks. The embodiments are not limited in this context.

At 908, a composite LSC table may be generated for the preprocessed image based on the respective weights for the set of LSC tables. For example, image signal processor (ISP) component 222-1 of FIG. 2 may generate a composite LSC table for preprocessed image 210 based on respective weights for a set of LSC tables 224. In some embodiments, the composite LSC table may be generated as a weighted sum of the set of LSC tables, based on the respective weights. At 910, the composite LSC table may be applied to the preprocessed image to generate a processed image. For example, ISP component 222-1 of FIG. 2 may apply a composite LSC table to preprocessed image 210 to obtain processed image 230. The embodiments are not limited to these examples.

Figure 10:
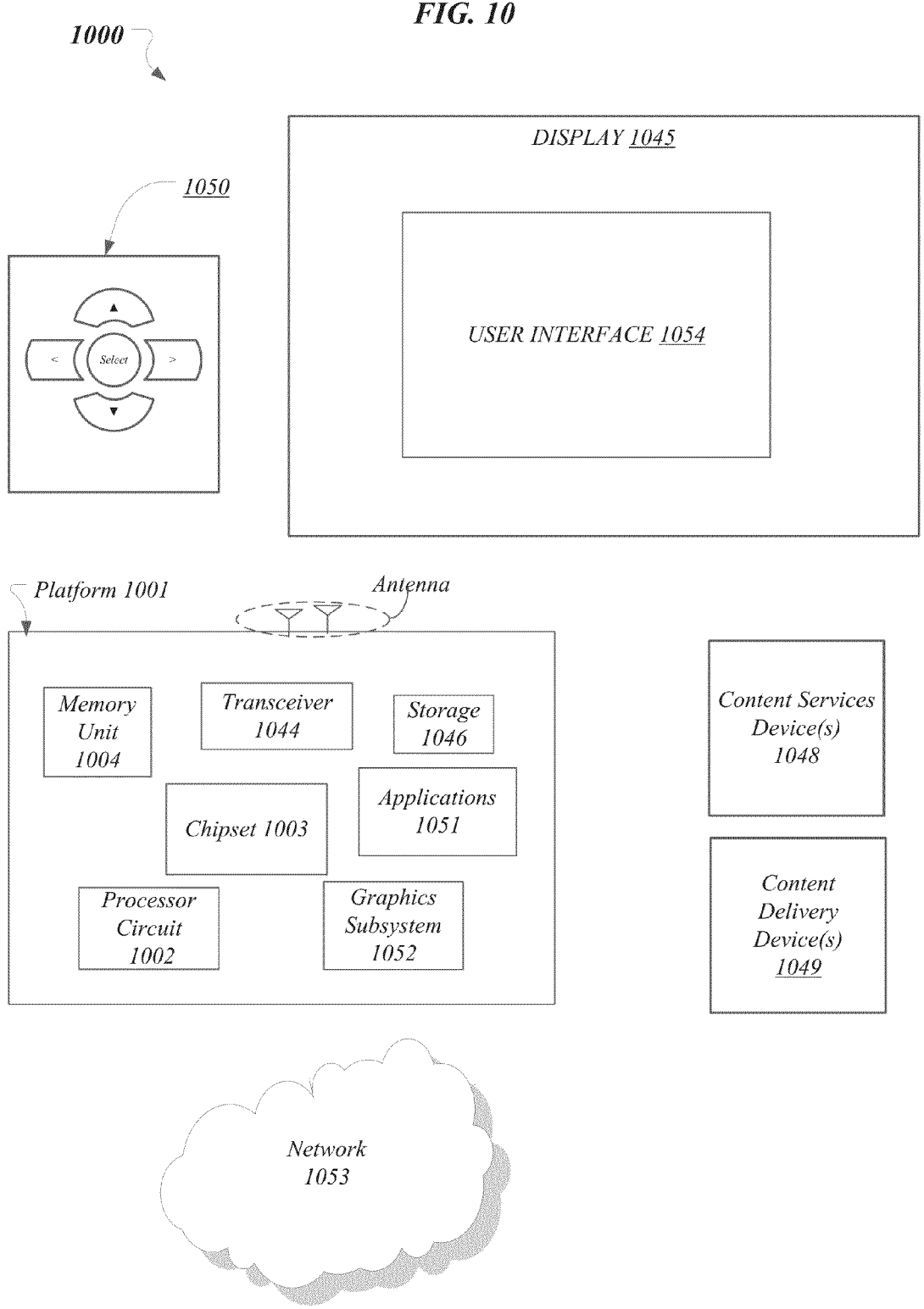
FIG. 10 illustrates an embodiment of a system

FIG. 10 illustrates an embodiment of a system 1000. In various embodiments, system 1000 may be representative of a system or architecture suitable for use with one or more embodiments described herein, such as device 100 of FIGS. 1A, 1B, application subsystem 200 of FIG. 2, storage medium 700 of FIG. 7, device 800 of FIG. 8, and/or logic flow 900 of FIG. 9. The embodiments are not limited in this respect.

As shown in FIG. 10, system 1000 may include multiple elements. One or more elements may be implemented using one or more circuits, components, registers, processors, software subroutines, modules, or any combination thereof, as desired for a given set of design or performance constraints. Although FIG. 10 shows a limited number of elements in a certain topology by way of example, it can be appreciated that more or less elements in any suitable topology may be used in system 1000 as desired for a given implementation. The embodiments are not limited in this context.

In embodiments, system 1000 may be a media system although system 1000 is not limited to this context. For example, system 1000 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, system 1000 includes a platform 1001 coupled to a display 1045. Platform 1001 may receive content from a content device such as content services device(s) 1048 or content delivery device(s) 1049 or other similar content sources. A navigation controller 1050 including one or more navigation features may be used to interact with, for example, platform 1001 and/or display 1045. Each of these components is described in more detail below.

In embodiments, platform 1001 may include any combination of a processor circuit 1002, chipset 1003, memory unit 1004, transceiver 1044, storage 1046, applications 1051, and/or graphics subsystem 1052. Chipset 1003 may provide intercommunication among processor circuit 1002, memory unit 1004, transceiver 1044, storage 1046, applications 1051, and/or graphics subsystem 1052. For example, chipset 1003 may include a storage adapter (not depicted) capable of providing intercommunication with storage 1046.

Processor circuit 1002 may be implemented using any processor or logic device, such as a complex instruction set computer (CISC) microprocessor, a reduced instruction set computing (RISC) microprocessor, a very long instruction word (VLIW) microprocessor, an x86 instruction set compatible processor, a processor implementing a combination of instruction sets, a multi-core processor such as a dual-core processor or dual-core mobile processor, or any other microprocessor or central processing unit (CPU). Processor circuit 1002 may also be implemented as a dedicated processor, such as a controller, a microcontroller, an embedded processor, a chip multiprocessor (CMP), a co-processor, a digital signal processor (DSP), a network processor, a media processor, an input/output (I/O) processor, a media access control (MAC) processor, a radio baseband processor, an application specific integrated circuit (ASIC), a field programmable gate array (FPGA), a programmable logic device (PLD), and so forth. In one embodiment, for example, processor circuit 1002 may be implemented as a general purpose processor, such as a processor made by Intel® Corporation, Santa Clara, Calif. The embodiments are not limited in this context.

Memory unit 1004 may be implemented using any machine-readable or computer-readable media capable of storing data, including both volatile and non-volatile memory. For example, memory unit 1004 may include read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information.

Transceiver 1044 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, transceiver 1044 may operate in accordance with one or more applicable standards in any version. In various embodiments, transceiver 1044 may comprise a radio frequency (RF) transceiver. The embodiments are not limited in this context.

Display 1045 may comprise any display device capable of displaying information received from processor circuit 1002. Examples for display 1045 may include a television, a monitor, a projector, and a computer screen. In one embodiment, for example, display 1045 may be implemented by a liquid crystal display (LCD), light emitting diode (LED) or other type of suitable visual interface. Display 1045 may comprise, for example, a touch-sensitive display screen ("touch-screen"). In various implementations, display 1045 may comprise one or more thin-film transistors (TFT) LCD including embedded transistors. The embodiments are not limited in this context.

Storage 1046 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 1046 may include technology to increase the storage performance enhanced protection for valuable digital media when multiple hard drives are included, for example. Further examples of storage 1046 may include a hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of DVD devices, a tape device, a cassette device, or the like. The embodiments are not limited in this context.

Graphics subsystem 1052 may perform processing of images such as still or video for display. Graphics subsystem 1052 may be a graphics processing unit (GPU) or a visual processing unit (VPU), for example. An analog or digital interface may be used to communicatively couple graphics subsystem 1052 and display 1045. For example, the interface may be any of a High-Definition Multimedia Interface, DisplayPort, wireless HDMI, and/or wireless HD compliant techniques. Graphics subsystem 1052 could be integrated into processor circuit 1002 or chipset 1003. Graphics subsystem 1052 could be a stand-alone card communicatively coupled to chipset 1003.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

In embodiments, content services device(s) 1048 may be hosted by any national, international and/or independent service and thus accessible to platform 1001 via the Internet, for example. Content services device(s) 1048 may be coupled to platform 1001 and/or to display 1045. Platform 1001 and/or content services device(s) 1048 may be coupled to a network 1053 to communicate (e.g., send and/or receive) media information to and from network 1053. Content delivery device(s) 1049 also may be coupled to platform 1001 and/or to display 1045.

In embodiments, content services device(s) 1048 may include a cable television box, personal computer, network, telephone, Internet enabled devices or appliance capable of delivering digital information and/or content, and any other similar device capable of unidirectionally or bidirectionally communicating content between content providers and platform 1001 and/display 1045, via network 1053 or directly. It will be appreciated that the content may be communicated unidirectionally and/or bidirectionally to and from any one of the components in system 1000 and a content provider via network 1053. Examples of content may include any media information including, for example, video, music, medical and gaming information, and so forth.

Content services device(s) 1048 receives content such as cable television programming including media information, digital information, and/or other content. Examples of content providers may include any cable or satellite television or radio or Internet content providers. The provided examples are not meant to limit embodiments of the disclosed subject matter.

In embodiments, platform 1001 may receive control signals from navigation controller 1050 having one or more navigation features. The navigation features of navigation controller 1050 may be used to interact with a user interface 1054, for example. In embodiments, navigation controller 1050 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of navigation controller 1050 may be echoed on a display (e.g., display 1045) by movements of a pointer, cursor, focus ring, or other visual indicators displayed on the display. For example, under the control of software applications 1051, the navigation features located on navigation controller 1050 may be mapped to virtual navigation features displayed on user interface 1054. In embodiments, navigation controller 1050 may not be a separate component but integrated into platform 1001 and/or display 1045. Embodiments, however, are not limited to the elements or in the context shown or described herein.

In embodiments, drivers (not shown) may include technology to enable users to instantly turn on and off platform 1001 like a television with the touch of a button after initial boot-up, when enabled, for example. Program logic may allow platform 1001 to stream content to media adaptors or other content services device(s) 1048 or content delivery device(s) 1049 when the platform is turned "off." In addition, chip set 1003 may include hardware and/or software support for 5.1 surround sound audio and/or high definition 7.1 surround sound audio, for example. Drivers may include a graphics driver for integrated graphics platforms. In embodiments, the graphics driver may include a peripheral component interconnect (PCI) Express graphics card.

In various embodiments, any one or more of the components shown in system 1000 may be integrated. For example, platform 1001 and content services device(s) 1048 may be integrated, or platform 1001 and content delivery device(s) 1049 may be integrated, or platform 1001, content services device(s) 1048, and content delivery device(s) 1049 may be integrated, for example. In various embodiments, platform 1001 and display 1045 may be an integrated unit. Display 1045 and content service device(s) 1048 may be integrated, or display 1045 and content delivery device(s) 1049 may be integrated, for example. These examples are not meant to limit the disclosed subject matter.

In various embodiments, system 1000 may be implemented as a wireless system, a wired system, or a combination of both. When implemented as a wireless system, system 1000 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1000 may include components and interfaces suitable for communicating over wired communications media, such as I/O adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 1001 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 10.

Figure 11:
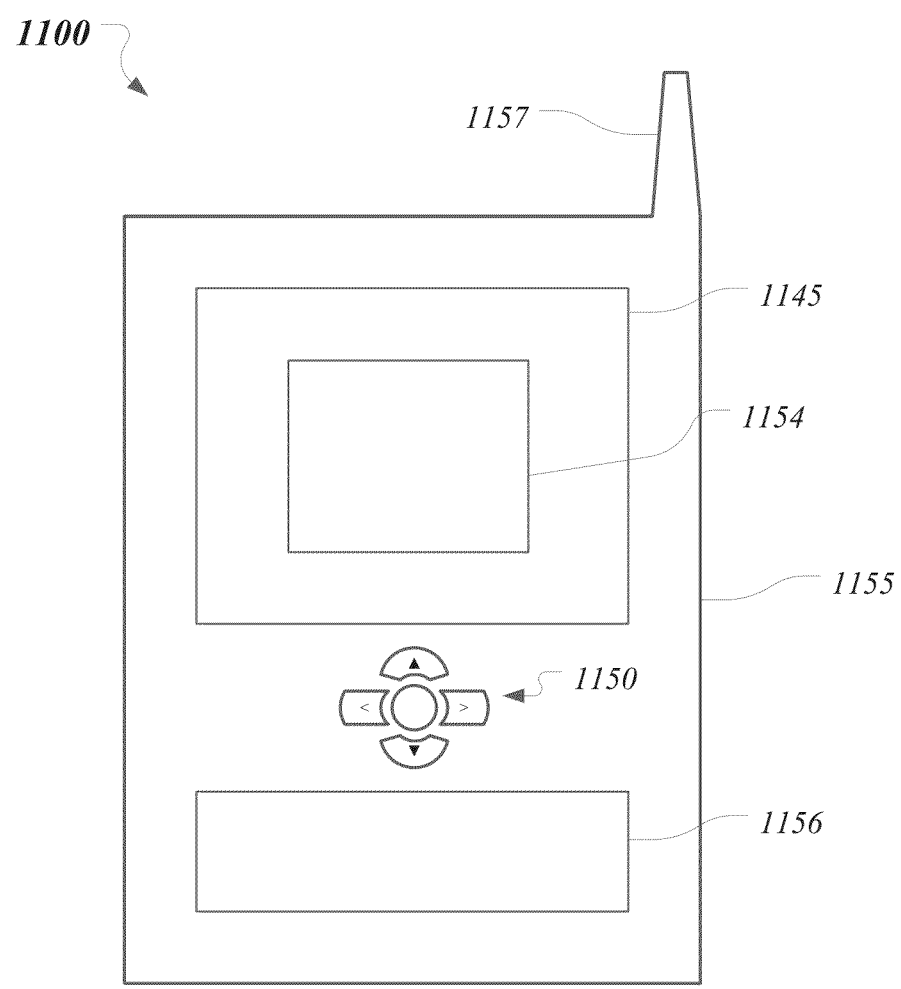
FIG. 11 illustrates an embodiment of a third device.

As described above, system 1000 may be embodied in varying physical styles or form factors. FIG. 11 illustrates embodiments of a small form factor device 1100 in which system 1000 may be embodied. In embodiments, for example, device 1100 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 11, device 1100 may include a display 1145, a navigation controller 1150, a user interface 1154, a housing 1155, an I/O device 1156, and an antenna 1157. Display 1145 may include any suitable display unit for displaying information appropriate for a mobile computing device, and may be the same as or similar to display 1045 in FIG. 10. Navigation controller 1150 may include one or more navigation features which may be used to interact with user interface 1154, and may be the same as or similar to navigation controller 1050 in FIG. 10. I/O device 1156 may include any suitable I/O device for entering information into a mobile computing device. Examples for I/O device 1156 may include an alphanumeric keyboard, a numeric keypad, a touch pad, input keys, buttons, switches, rocker switches, microphones, speakers, voice recognition device and software, and so forth. Information also may be entered into device 1100 by way of microphone. Such information may be digitized by a voice recognition device. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The following examples pertain to further embodiments:

Example 1 is an image processing apparatus, comprising logic, at least a portion of which is in hardware, the logic to determine a respective set of error values for each of a set of lens shading correction (LSC) tables, each set of error values describing error associated with application of its corresponding LSC table to a preprocessed image, determine a respective weight for each of the set of LSC tables based on the corresponding set of error values for that LSC table, and generate a composite LSC table for the preprocessed image as a weighted sum of the set of LSC tables, based on the respective weights for the set of LSC tables.

In Example 2, the logic of Example 1 may optionally segment the preprocessed image into multiple blocks and, for each LSC table in the set of LSC tables, calculate a respective set of block error values, and each block error value may optionally comprise an error value for one of the multiple blocks.

In Example 3, the logic of Example 2 may optionally calculate, for each LSC table in the set of LSC tables, a respective set of block weights based on the set of block error values for that LSC table, each block weight comprising a weight for one of the multiple blocks, and calculate the respective weight for each of the set of LSC tables as a weighted sum of the set of block weights for that LSC table.

In Example 4, the logic of Example 3 may optionally identify a set of reliability parameters for the multiple blocks, each reliability parameter indicating a level of reliability for an error value of one of the multiple blocks, and calculate the weighted sum of the set of block weights for each LSC table by weighting the block weights according to the reliability parameters for their corresponding blocks.

In Example 5, the set of reliability parameters of Example 4 may optionally comprise approximations based on simulation results or tests performed on image sensor data.

In Example 6, the logic of any one of Examples 4 to 5 may optionally segment the preprocessed image into four rows and six columns of blocks, and the set of reliability parameters may optionally comprise a reliability parameter matrix comprising four rows and six columns.

In Example 7, each LSC table of any one of Examples 1 to 6 may optionally correspond to a different respective illuminant.

In Example 8, the logic of Example 7 may optionally calculate, for each of a plurality of LSC tables, a respective probability of presence of its corresponding illuminant, and define the set of LSC tables to comprise each LSC table among the plurality of LSC tables for which the probability of presence of the corresponding illuminant is greater than zero.

In Example 9, the logic of any one of Examples 2 to 8 may optionally select a number of blocks into which to segment the preprocessed image based on a content of the preprocessed image and segment the preprocessed image into the selected number of blocks.

In Example 10, the logic of any one of Examples 1 to 9 may optionally generate a plurality of composite LSC tables for the preprocessed image, and each LSC table may optionally correspond to a respective color.

In Example 11, the logic of any one of Examples 1 to 10 may optionally apply the composite LSC table to the preprocessed image to generate a processed image.

In Example 12, the logic of Example 11 may optionally output the processed image to a video controller to present the processed image on a digital display.

In Example 13, each LSC table of any one of Examples 1 to 12 may optionally comprise one or more correlated color temperature (CCT) values.

In Example 14, each LSC table of any one of Examples 1 to 13 may optionally be stored in a persistent storage.

In Example 15, the logic of any one of Examples 1 to 14 may optionally determine the respective weights for the set of LSC tables during a run-time execution of a camera application.

Example 16 is a system, comprising an image processing apparatus according to any one of Examples 1 to 15, a display, a radio frequency (RF) transceiver, and one or more RF antennas.

Example 17 is at least one non-transitory machine-readable medium comprising a set of image processing instructions that, in response to being executed on a computing device, cause the computing device to determine a respective set of error values for each of a set of lens shading correction (LSC) tables, each set of error values describing error associated with application of its corresponding LSC table to a preprocessed image, determine a respective weight for each of the set of LSC tables based on the corresponding set of error values for that LSC table, and generate a composite LSC table for the preprocessed image as a weighted sum of the set of LSC tables, based on the respective weights for the set of LSC tables.

In Example 18, the at least one non-transitory machine-readable medium of Example 17 may optionally comprise image processing instructions that, in response to being executed on the computing device, cause the computing device to segment the preprocessed image into multiple blocks, and for each LSC table in the set of LSC tables, calculate a respective set of block error values, and each block error value may optionally comprise an error value for one of the multiple blocks.

In Example 19, the at least one non-transitory machine-readable medium of Example 18 may optionally comprise image processing instructions that, in response to being executed on the computing device, cause the computing device to for each LSC table in the set of LSC tables, calculate a respective set of block weights based on the set of block error values for that LSC table, each block weight comprising a weight for one of the multiple blocks, and calculate the respective weight for each of the set of LSC tables as a weighted sum of the set of block weights for that LSC table.

In Example 20, the at least one non-transitory machine-readable medium of Example 19 may optionally comprise image processing instructions that, in response to being executed on the computing device, cause the computing device to identify a set of reliability parameters for the multiple blocks, each reliability parameter indicating a level of reliability for an error value of one of the multiple blocks, and calculate the weighted sum of the set of block weights for each LSC table by weighting the block weights according to the reliability parameters for their corresponding blocks.

In Example 21, the set of reliability parameters of Example 20 may optionally comprise approximations based on simulation results or tests performed on image sensor data.

In Example 22, the at least one non-transitory machine-readable medium of any one of Examples 20 to 21 may optionally comprise image processing instructions that, in response to being executed on the computing device, cause the computing device to segment the preprocessed image into four rows and six columns of blocks, and the set of reliability parameters may optionally comprise a reliability parameter matrix comprising four rows and six columns.

In Example 23, each LSC table of any one of Examples 17 to 22 may optionally correspond to a different respective illuminant.

In Example 24, the at least one non-transitory machine-readable medium of Example 23 may optionally comprise image processing instructions that, in response to being executed on the computing device, cause the computing device to calculate, for each of a plurality of LSC tables, a respective probability of presence of its corresponding illuminant, and define the set of LSC tables to comprise each LSC table among the plurality of LSC tables for which the probability of presence of the corresponding illuminant is greater than zero.

In Example 25, the at least one non-transitory machine-readable medium of any one of Examples 18 to 24 may optionally comprise image processing instructions that, in response to being executed on the computing device, cause the computing device to select a number of blocks into which to segment the preprocessed image based on a content of the preprocessed image, and segment the preprocessed image into the selected number of blocks.

In Example 26, the at least one non-transitory machine-readable medium of any one of Examples 17 to 25 may optionally comprise image processing instructions that, in response to being executed on the computing device, cause the computing device to generate a plurality of composite LSC tables for the preprocessed image, and each LSC table may optionally correspond to a respective color.

In Example 27, the at least one non-transitory machine-readable medium of any one of Examples 17 to 26 may optionally comprise image processing instructions that, in response to being executed on the computing device, cause the computing device to apply the composite LSC table to the preprocessed image to generate a processed image.

In Example 28, the at least one non-transitory machine-readable medium of Example 27 may optionally comprise image processing instructions that, in response to being executed on the computing device, cause the computing device to output the processed image to a video controller to present the processed image on a digital display.

In Example 29, each LSC table of any one of Examples 17 to 28 may optionally comprise one or more correlated color temperature (CCT) values.

In Example 30, each LSC table of any one of Examples 17 to 29 may optionally be stored in a persistent storage.

In Example 31, the at least one non-transitory machine-readable medium of any one of Examples 17 to 30 may optionally comprise image processing instructions that, in response to being executed on the computing device, cause the computing device to determine the respective weights for the set of LSC tables during a run-time execution of a camera application.

Example 32 is an image processing method, comprising determining, by a processor circuit, a respective set of error values for each of a set of lens shading correction (LSC) tables, each set of error values describing error associated with application of its corresponding LSC table to a preprocessed image, determining a respective weight for each of the set of LSC tables based on the corresponding set of error values for that LSC table, and generating a composite LSC table for the preprocessed image as a weighted sum of the set of LSC tables, based on the respective weights for the set of LSC tables.

In Example 33, the image processing method of Example 32 may optionally comprise segmenting the preprocessed image into multiple blocks, and for each LSC table in the set of LSC tables, calculating a respective set of block error values, and each block error value may optionally comprise an error value for one of the multiple blocks.

In Example 34, the image processing method of Example 33 may optionally comprise for each LSC table in the set of LSC tables, calculating a respective set of block weights based on the set of block error values for that LSC table, each block weight comprising a weight for one of the multiple blocks, and calculating the respective weight for each of the set of LSC tables as a weighted sum of the set of block weights for that LSC table.

In Example 35, the image processing method of Example 34 may optionally comprise identifying a set of reliability parameters for the multiple blocks, each reliability parameter indicating a level of reliability for an error value of one of the multiple blocks, and calculating the weighted sum of the set of block weights for each LSC table by weighting the block weights according to the reliability parameters for their corresponding blocks.

In Example 36, the set of reliability parameters of Example 35 may optionally comprise approximations based on simulation results or tests performed on image sensor data.

In Example 37, the image processing method of any one of Examples 35 to 36 may optionally comprise segmenting the preprocessed image into four rows and six columns of blocks, and the set of reliability parameters may optionally comprise a reliability parameter matrix comprising four rows and six columns.

In Example 38, each LSC table of any one of Examples 32 to 37 may optionally correspond to a different respective illuminant.

In Example 39, the image processing method of Example 38 may optionally comprise calculating, for each of a plurality of LSC tables, a respective probability of presence of its corresponding illuminant, and defining the set of LSC tables to comprise each LSC table among the plurality of LSC tables for which the probability of presence of the corresponding illuminant is greater than zero.

In Example 40, the image processing method of any one of Examples 33 to 39 may optionally comprise selecting a number of blocks into which to segment the preprocessed image based on a content of the preprocessed image, and segmenting the preprocessed image into the selected number of blocks.

In Example 41, the image processing method of any one of Examples 32 to 40 may optionally comprise generating a plurality of composite LSC tables for the preprocessed image, and each LSC table may optionally correspond to a respective color.

In Example 42, the image processing method of any one of Examples 32 to 41 may optionally comprise applying the composite LSC table to the preprocessed image to generate a processed image.

In Example 43, the image processing method of Example 42 may optionally comprise outputting the processed image to a video controller to present the processed image on a digital display.

In Example 44, each LSC table of any one of Examples 32 to 43 may optionally comprise one or more correlated color temperature (CCT) values.

In Example 45, each LSC table of any one of Examples 32 to 44 may optionally be stored in a persistent storage.

In Example 46, the image processing method of any one of Examples 32 to 45 may optionally comprise determining the respective weights for the set of LSC tables during a run-time execution of a camera application.

Example 47 is at least one machine-readable medium comprising a set of instructions that, in response to being executed on a computing device, cause the computing device to perform an image processing method according to any one of Examples 32 to 46.

Example 48 is an apparatus, comprising means for performing an image processing method according to any one of Examples 32 to 46.

Example 49 is a system, comprising an apparatus according to Example 48, a display, a radio frequency (RF) transceiver, and one or more RF antennas.

Example 50 is an image processing apparatus, comprising means for determining a respective set of error values for each of a set of lens shading correction (LSC) tables, each set of error values describing error associated with application of its corresponding LSC table to a preprocessed image, means for determining a respective weight for each of the set of LSC tables based on the corresponding set of error values for that LSC table, and means for generating a composite LSC table for the preprocessed image as a weighted sum of the set of LSC tables, based on the respective weights for the set of LSC tables.

In Example 51, the image processing apparatus of Example 50 may optionally comprise means for segmenting the preprocessed image into multiple blocks, and means for calculating, for each LSC table in the set of LSC tables, a respective set of block error values, and each block error value may optionally comprise an error value for one of the multiple blocks.

In Example 52, the image processing apparatus of Example 51 may optionally comprise means for calculating, for each LSC table in the set of LSC tables, a respective set of block weights based on the set of block error values for that LSC table, each block weight comprising a weight for one of the multiple blocks, and means for calculating the respective weight for each of the set of LSC tables as a weighted sum of the set of block weights for that LSC table.

In Example 53, the image processing apparatus of Example 52 may optionally comprise means for identifying a set of reliability parameters for the multiple blocks, each reliability parameter indicating a level of reliability for an error value of one of the multiple blocks, and means for calculating the weighted sum of the set of block weights for each LSC table by weighting the block weights according to the reliability parameters for their corresponding blocks.

In Example 54, the set of reliability parameters of Example 53 may optionally comprise approximations based on simulation results or tests performed on image sensor data.

In Example 55, the image processing apparatus of any one of Examples 53 to 54 may optionally comprise means for segmenting the preprocessed image into four rows and six columns of blocks, and the set of reliability parameters may optionally comprise a reliability parameter matrix comprising four rows and six columns.

In Example 56, each LSC table of any one of Examples 50 to 55 may optionally correspond to a different respective illuminant.

In Example 57, the image processing apparatus of Example 56 may optionally comprise means for calculating, for each of a plurality of LSC tables, a respective probability of presence of its corresponding illuminant, and means for defining the set of LSC tables to comprise each LSC table among the plurality of LSC tables for which the probability of presence of the corresponding illuminant is greater than zero.

In Example 58, the image processing apparatus of any one of Examples 51 to 57 may optionally comprise means for selecting a number of blocks into which to segment the preprocessed image based on a content of the preprocessed image, and means for segmenting the preprocessed image into the selected number of blocks.

In Example 59, the image processing apparatus of any one of Examples 50 to 58 may optionally comprise means for generating a plurality of composite LSC tables for the preprocessed image, and each LSC table may optionally correspond to a respective color.

In Example 60, the image processing apparatus of any one of Examples 50 to 59 may optionally comprise means for applying the composite LSC table to the preprocessed image to generate a processed image.

In Example 61, the image processing apparatus of Example 60 may optionally comprise means for outputting the processed image to a video controller to present the processed image on a digital display.

In Example 62, each LSC table of any one of Examples 50 to 61 may optionally comprise one or more correlated color temperature (CCT) values.

In Example 63, each LSC table of any one of Examples 50 to 62 may optionally be stored in a persistent storage.

In Example 64, the image processing apparatus of any one of Examples 50 to 63 may optionally comprise means for determining the respective weights for the set of LSC tables during a run-time execution of a camera application.

Example 65 is a system, comprising an image processing apparatus according to any one of Examples 50 to 64, a display, a radio frequency (RF) transceiver, and one or more RF antennas.

Numerous specific details have been set forth herein to provide a thorough understanding of the embodiments. It will be understood by those skilled in the art, however, that the embodiments may be practiced without these specific details. In other instances, well-known operations, components, and circuits have not been described in detail so as not to obscure the embodiments. It can be appreciated that the specific structural and functional details disclosed herein may be representative and do not necessarily limit the scope of the embodiments.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other. Furthermore, aspects or elements from different embodiments may be combined.

It is emphasized that the Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment. In the appended claims, the terms "including" and "in which"

are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. An apparatus, comprising:

logic, at least a portion of which is in hardware, the logic to determine a respective set of error values for each of a set of lens shading correction (LSC) tables, each set of error values describing error associated with application of its corresponding LSC table to a preprocessed image, determine a respective weight for each of the set of LSC tables based on the corresponding set of error values for that LSC table, generate a composite LSC table for the preprocessed image as a weighted sum of the set of LSC tables, based on the respective weights for the set of LSC tables, and apply the composite LSC table to the preprocessed image to generate a processed image.

2. The apparatus of claim 1, the logic to segment the preprocessed image into multiple blocks and, for each LSC table in the set of LSC tables, calculate a respective set of block error values, each block error value comprising an error value for one of the multiple blocks.

3. The apparatus of claim 2, the logic to, for each LSC table in the set of LSC tables, calculate a respective set of block weights based on the set of block error values for that LSC table, each block weight comprising a weight for one of the multiple blocks, and calculate the respective weight for each of the set of LSC tables as a weighted sum of the set of block weights for that LSC table.

4. The apparatus of claim 3, the logic to identify a set of reliability parameters for the multiple blocks, each reliability parameter indicating a level of reliability for an error value of one of the multiple blocks, and calculate the weighted sum of the set of block weights for each LSC table by weighting the block weights according to the reliability parameters for their corresponding blocks.

5. The apparatus of claim 1, each LSC table corresponding to a different respective illuminant.

6. The apparatus of claim 5, the logic to calculate, for each of a plurality of LSC tables, a respective probability of presence of its corresponding illuminant, and define the set of LSC tables to comprise each LSC table among the plurality of LSC tables for which the probability of presence of the corresponding illuminant is greater than zero.

7. The apparatus of claim 2, the logic to select a number of blocks into which to segment the preprocessed image based on a content of the preprocessed image and segment the preprocessed image into the selected number of blocks.

8. The apparatus of claim 1, the logic to generate a plurality of composite LSC tables for the preprocessed image, each LSC table corresponding to a respective color.

9. The apparatus of claim 1, comprising:

a display;

a radio frequency (RF) transceiver; and one or more RF antennas.

10. At least one non-transitory machine-readable medium comprising a set of instructions that, in response to being executed on a computing device, cause the computing device to:

determine a respective set of error values for each of a set of lens shading correction (LSC) tables, each set of error values describing error associated with application of its corresponding LSC table to a preprocessed image;

determine a respective weight for each of the set of LSC tables based on the corresponding set of error values for that LSC table;

generate a composite LSC table for the preprocessed image as a weighted sum of the set of LSC tables, based on the respective weights for the set of LSC tables; and apply the composite LSC table to the preprocessed image to generate a processed image.

11. The at least one non-transitory machine-readable medium of claim 10, comprising instructions that, in response to being executed on the computing device, cause the computing device to:

segment the preprocessed image into multiple blocks; and for each LSC table in the set of LSC tables, calculate a respective set of block error values, each block error value comprising an error value for one of the multiple blocks.

12. The at least one non-transitory machine-readable medium of claim 11, comprising instructions that, in response to being executed on the computing device, cause the computing device to:

for each LSC table in the set of LSC tables, calculate a respective set of block weights based on the set of block error values for that LSC table, each block weight comprising a weight for one of the multiple blocks; and calculate the respective weight for each of the set of LSC tables as a weighted sum of the set of block weights for that LSC table.

13. The at least one non-transitory machine-readable medium of claim 12, comprising instructions that, in response to being executed on the computing device, cause the computing device to:

identify a set of reliability parameters for the multiple blocks, each reliability parameter indicating a level of reliability for an error value of one of the multiple blocks; and calculate the weighted sum of the set of block weights for each LSC table by weighting the block weights according to the reliability parameters for their corresponding blocks.

14. The at least one non-transitory machine-readable medium of claim 10, each LSC table corresponding to a different respective illuminant.

15. The at least one non-transitory machine-readable medium of claim 14, comprising instructions that, in response to being executed on the computing device, cause the computing device to:

calculate, for each of a plurality of LSC tables, a respective probability of presence of its corresponding illuminant; and define the set of LSC tables to comprise each LSC table among the plurality of LSC tables for which the probability of presence of the corresponding illuminant is greater than zero.

16. The at least one non-transitory machine-readable medium of claim 11, comprising instructions that, in response to being executed on the computing device, cause the computing device to:

select a number of blocks into which to segment the preprocessed image based on a content of the preprocessed image; and segment the preprocessed image into the selected number of blocks.

17. The at least one non-transitory machine-readable medium of claim 10, comprising instructions that, in response to being executed on the computing device, cause the computing device to generate a plurality of composite LSC tables for the preprocessed image, each LSC table corresponding to a respective color.

18. A method, comprising:

determining, by a processor circuit, a respective set of error values for each of a set of lens shading correction (LSC) tables, each set of error values describing error associated with application of its corresponding LSC table to a preprocessed image;

determining a respective weight for each of the set of LSC tables based on the corresponding set of error values for that LSC table;

generating a composite LSC table for the preprocessed image as a weighted sum of the set of LSC tables, based on the respective weights for the set of LSC tables; and applying the composite LSC table to the preprocessed image to generate a processed image.

19. The method of claim 18, comprising:

segmenting the preprocessed image into multiple blocks; and for each LSC table in the set of LSC tables, calculating a respective set of block error values, each block error value comprising an error value for one of the multiple blocks.

20. The method of claim 19, comprising:

for each LSC table in the set of LSC tables, calculating a respective set of block weights based on the set of block error values for that LSC table, each block weight comprising a weight for one of the multiple blocks; and calculating the respective weight for each of the set of LSC tables as a weighted sum of the set of block weights for that LSC table.

21. The method of claim 20, comprising:

identifying a set of reliability parameters for the multiple blocks, each reliability parameter indicating a level of reliability for an error value of one of the multiple blocks; and calculating the weighted sum of the set of block weights for each LSC table by weighting the block weights according to the reliability parameters for their corresponding blocks.

22. The method of claim 18, each LSC table corresponding to a different respective illuminant.

23. The method of claim 22, comprising:

calculating, for each of a plurality of LSC tables, a respective probability of presence of its corresponding illuminant; and defining the set of LSC tables to comprise each LSC table among the plurality of LSC tables for which the probability of presence of the corresponding illuminant is greater than zero.

24. The method of claim 19, comprising:

selecting a number of blocks into which to segment the preprocessed image based on a content of the preprocessed image; and segmenting the preprocessed image into the selected number of blocks.

25. The method of claim 18, comprising generating a plurality of composite LSC tables for the preprocessed image, each LSC table corresponding to a respective color.

* * * * *